United States Patent [19]

Wijnhoven et al.

[11] Patent Number: 4,989,844
[45] Date of Patent: Feb. 5, 1991

[54] VEHICLE LEVELING SHOCK ABSORBER ASSEMBLY

[75] Inventors: Jan M. A. Wijnhoven; Henri C. J. Vanhove, both of Sint Truiden; Marc J. I. I. J. Panis, Kessel-Lo, all of Belgium

[73] Assignee: Monroe Auto Equipment Company, Monroe, Mich.

[21] Appl. No.: 270,543

[22] Filed: Nov. 14, 1988

Related U.S. Application Data

[62] Division of Ser. No. 877,121, Jun. 23, 1986, Pat. No. 4,802,657.

[51] Int. Cl.$^5$ ................................................ F16F 9/04
[52] U.S. Cl. .................................... 267/64.24; 280/711
[58] Field of Search ............... 267/64.21, 64.24, 64.27; 280/711

[56]  References Cited

U.S. PATENT DOCUMENTS

| | | | |
|---|---|---|---|
| 3,046,003 | 7/1962 | Schultz | 267/64.24 |
| 3,178,167 | 4/1965 | Loewis | 267/64.21 |
| 4,206,907 | 6/1980 | Harrod | 267/64.24 |
| 4,555,096 | 11/1985 | Pryor | 267/64.21 |
| 4,574,450 | 3/1986 | Fannin et al. | 267/64.24 X |
| 4,588,171 | 5/1986 | Stephens | 267/64.24 |
| 4,688,774 | 8/1987 | Warmuth, II | 267/64.21 |

FOREIGN PATENT DOCUMENTS

| | | | |
|---|---|---|---|
| 3610144 | 10/1987 | Fed. Rep. of Germany | 267/64.24 |
| 901193 | 7/1962 | United Kingdom | 267/64.24 |

Primary Examiner—George E. A. Halvosa
Attorney, Agent, or Firm—Harness, Dickey & Pierce

[57]  ABSTRACT

An improved shock absorbing and leveling system for vehicles or the like is disclosed and includes a shock absorber sub-assembly and an airspring sub-assembly that can be used as either an assist device for a primary spring or as a primary spring itself. The preferred airspring sub-assembly includes a relatively rigid chamber member and a rolling flexible diaphragm member sealingly interconnected to one another, with an electrical inductance height sensor surrounding the shock absorber and contained substantially wholly within the chamber member. The airspring sub-assembly also preferably includes a diaphragm support member that laterally supports the diaphragm member on the shock absorber housing in a laterally spaced-apart relationship at least at two longitudinal positions thereon. Advantageously, the shock absorber sub-assembly and the airspring sub-assembly are independently removable from one another and replaceable as separate sub-assemblies.

9 Claims, 4 Drawing Sheets

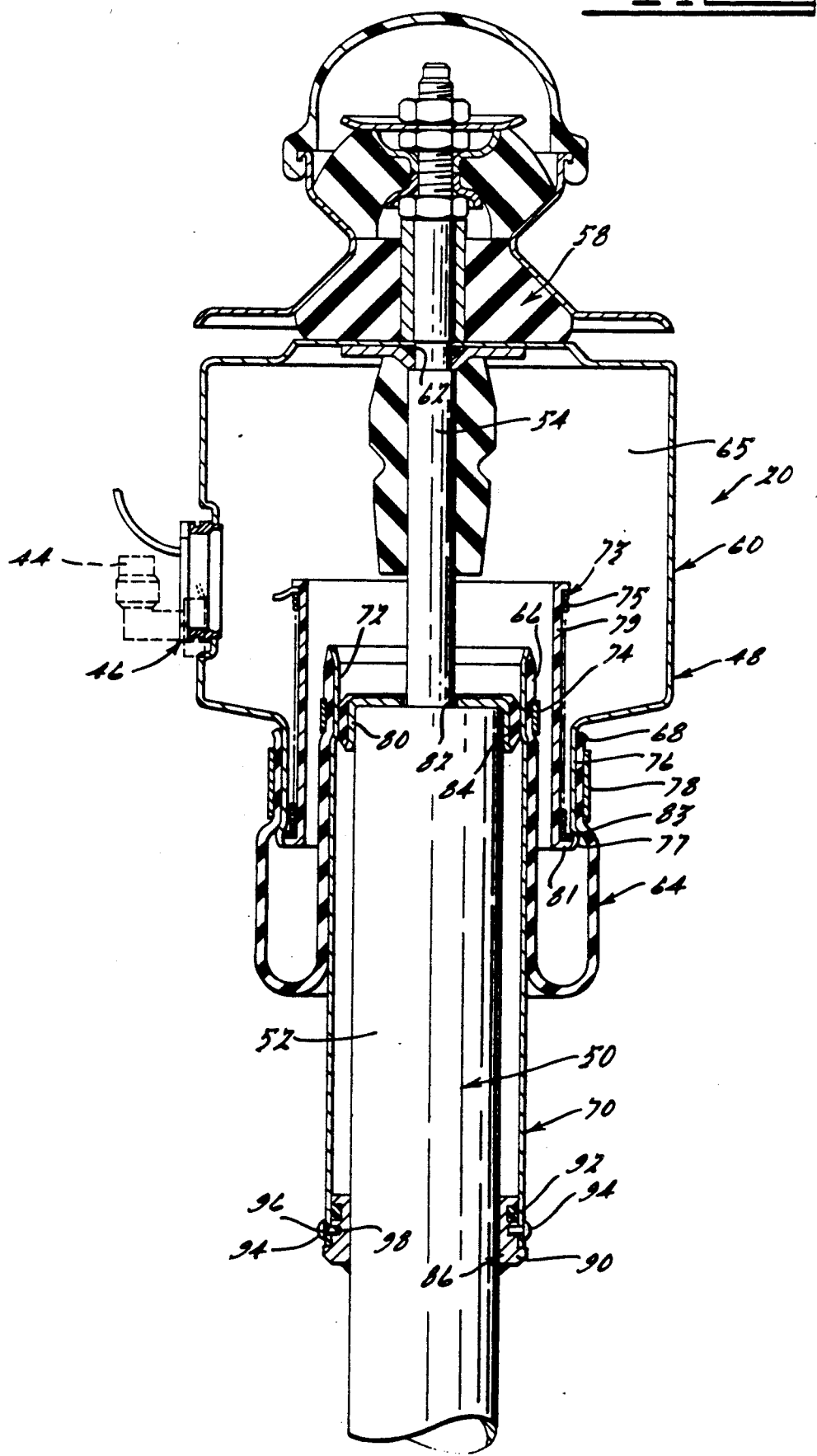

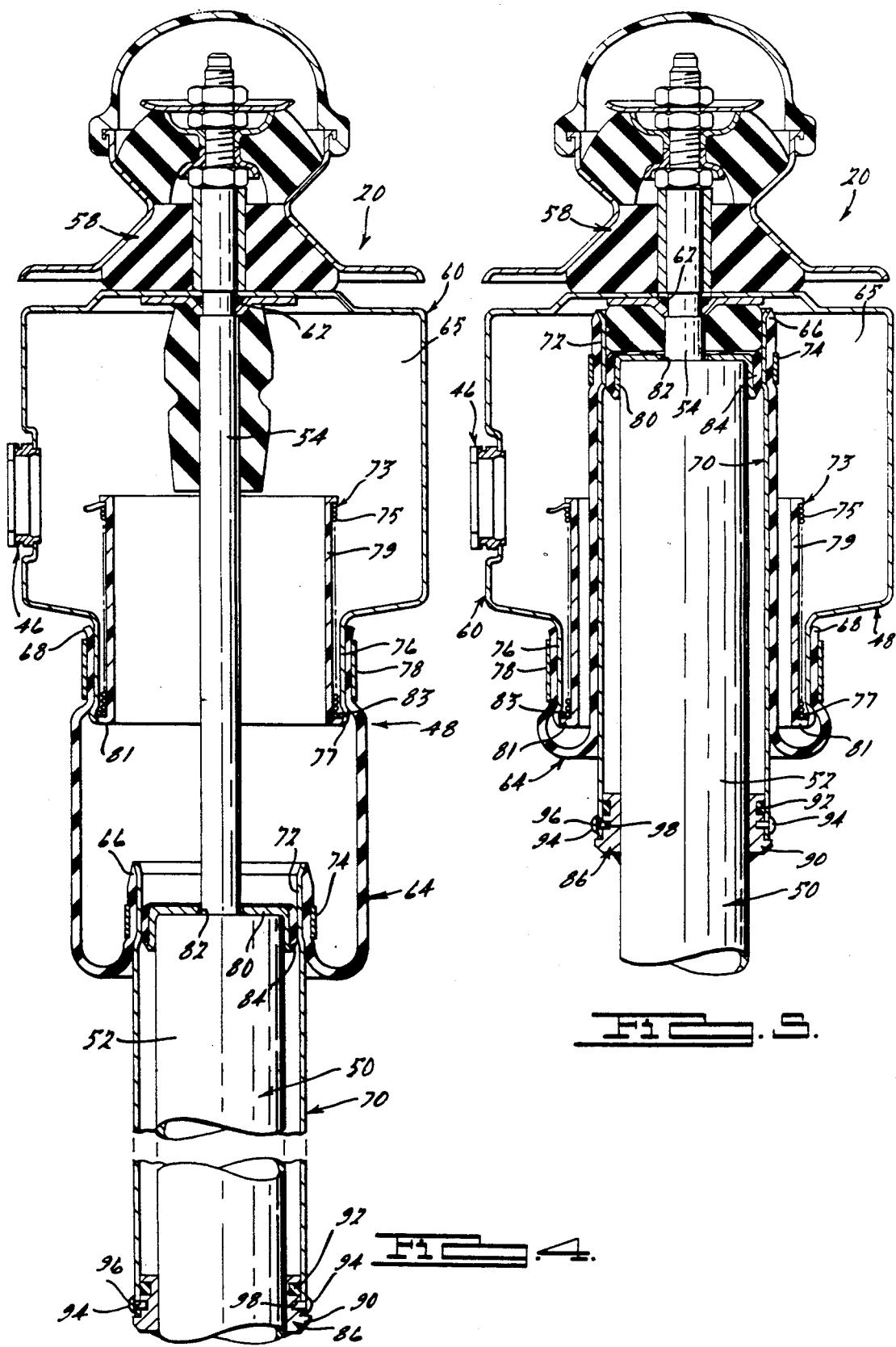

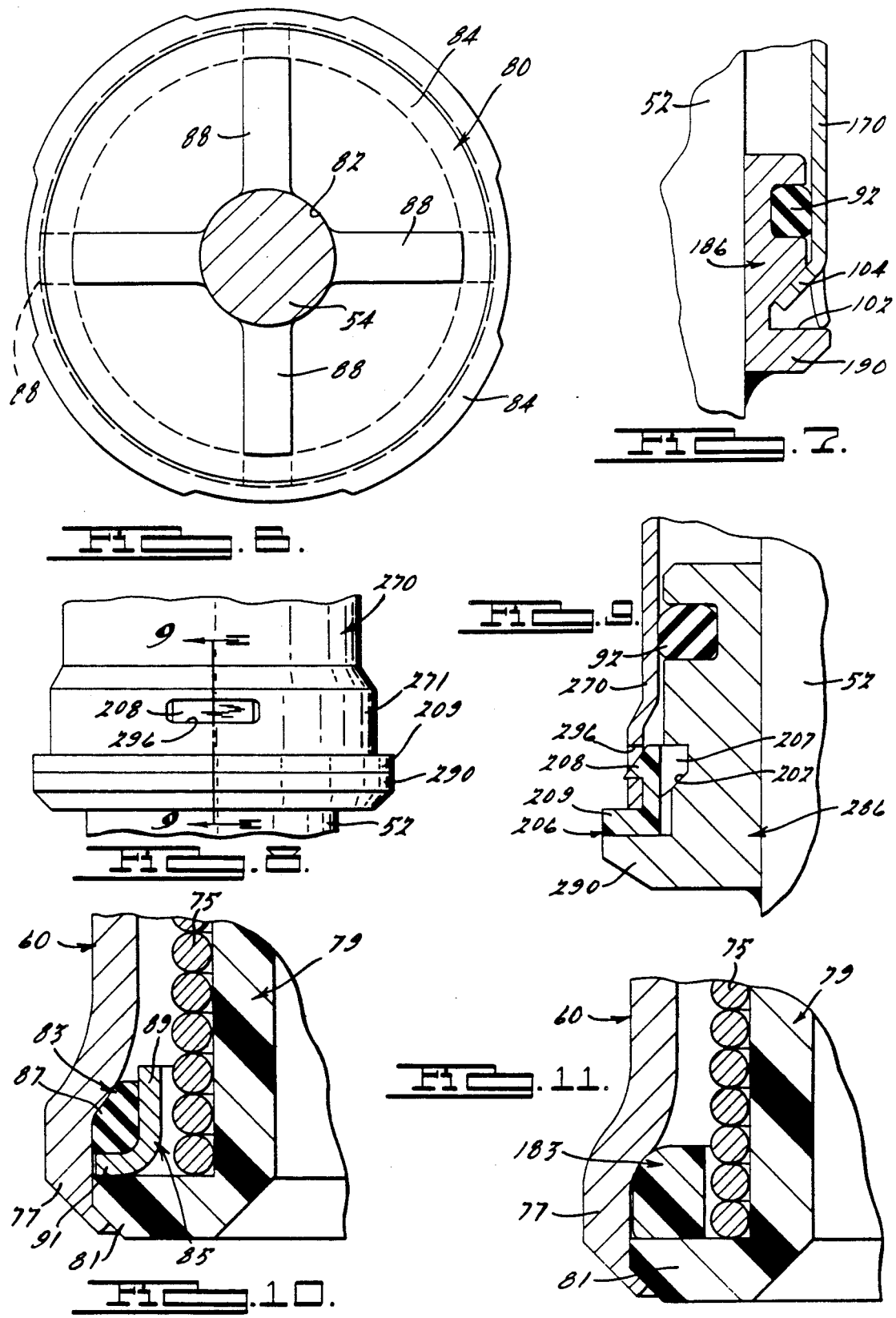

VEHICLE LEVELING SHOCK ABSORBER ASSEMBLY

This is a division of U.S. patent application Ser. No. 877,121, filed June 23, 1986, now U.S. Pat. No. 4,802,657.

BACKGROUND AND SUMMARY OF THE INVENTION

The present invention relates generally to shock absorbers for vehicles or the like, and more specifically to shock absorber assemblies having provisions for vehicle leveling to maintain a predetermined height relationship between the chassis of the vehicle and its ground-engaging wheel and axle assembly.

Various vehicle leveling systems have been included in or with shock absorber components, wherein a pressurized fluid such as pressurized air is admitted or released from a pressurizable fluid chamber in connection with a strut or shock absorber. In prior assemblies of this type, the pressurizable fluid chamber has been used as an air suspension device for assisting a primary or other suspension system, as well as being used as a load-leveling apparatus. In addition, such prior systems have included vehicle height sensing devices adapted to sense sustained changes in the height relationship between the chassis and the ground-engaging wheel and axle assembly in order to cause admission or release of pressurized fluid to or from the pressurizable fluid chamber in order to maintain a desired vehicle height relationship. Some recent examples of such suspension systems, both with and without the height sensing provisions discussed above, include U.S. Pat. Nos. 3,954,257; 4,017,099; 4,067,558; 4,141,572; and 4,206,907, the disclosures of which are all incorporated by reference herein.

Although the above-discussed prior shock absorber and suspension systems have generally provided significant advantages over their predecessors, many of such prior shock absorber or suspension systems have proved to be relatively expensive, complex, or inconvenient to manufacture or service. Furthermore, many of the prior shock absorber and leveling systems have required the replacement of both the shock absorber portion of the system, as well as the vehicle leveling portion of the system, whenever either of these components required replacement.

Therefore, it is a general object of the present invention to provide a new and improved shock absorbing and vehicle leveling system in the form of a shock absorber assembly that is adaptable to either conventional hydraulic shock absorbers or to strut-type shock absorber devices for automotive vehicles and for other applications.

A more specific object of the present invention is to provide a new and improved shock absorbing and vehicle leveling system that allows the shock absorber portion of the system and the vehicle leveling portion of the system to be removable and separately replaceable as independent sub-assemblies.

Still another object of the present invention is to provide a shock absorbing and vehicle leveling system wherein the shock absorber portion of the system and the vehicle portion of the system are separate sub-assemblies that are each interchangeable with other corresponding components having different characteristics such that the characteristics or operating parameters of each of these sub-assemblies can be optimized for a given shock absorber assembly application.

Still another of the basic objectives of the present invention is to provide a new and improved shock absorbing and vehicle leveling system having a relatively simple design, that is economical to manufacture, and which has a long and effective operational life.

In accordance with one aspect of the present invention, a fluid adjustable shock absorber assembly includes a shock absorber component having an elongated shock absorber housing and a piston rod extending from a longitudinally outer end of the housing for longitudinal movement relative thereto, as well as a generally hollow chamber member generally surrounding at least a portion of the shock absorber and sealingly interconnected with an outer end of the shock absorber's piston rod. A flexible diaphragm member is sealingly interconnected with the chamber member and the housing of the shock absorber such that the chamber member and the diaphragm member define a pressurizable fluid chamber with the shock absorber's piston rod and housing. An electrical inductance sensing device is fixedly attached to the chamber member, which is preferably relatively rigid, and is contained substantially wholly therein for sensing the relative longitudinal positions of the shock absorber housing and piston rod. The electrical inductance sensing device can be used either with or without the pressurizable fluid chamber and diaphragm. Preferably, the electrical inductance sensing device is fixedly interconnected with a longitudinally inner end of the chamber member and extends longitudinally outwardly therewithin. A fluid pressure supply system is operable in response to the sensing of the varying relative longitudinal positions of the shock absorber housing relative to the piston rod for supplying a pressurized fluid to, and venting pressurized fluid from, the pressurizable fluid chamber in order to adjust or maintain the relative longitudinal positions of the shock absorber housing and piston rod within predetermined limits. By such adjustments, the shock absorber assembly maintains the vehicle height relative to its ground-engaging axle and wheel assembly within predetermined desirable limits.

In accordance with another aspect of the present invention, which can be employed either with or without the above-mentioned features of the present invention, a diaphragm support member is provided for laterally supporting at least a portion of the flexible diaphragm member in a laterally spaced-apart relationship with the shock absorber housing at least at a pair of longitudinally spaced-apart positions on the shock absorber housing. Preferably, the diaphragm support member, which is sealingly interconnected with the flexible diaphragm member, is removably and sealingly interconnected with the shock absorber housing, and the diaphragm member is sealingly and removably interconnected with the piston rod, such that the diaphragm support member and the diaphragm member (as well as a relatively rigid chamber member, if any) are removable as a separate sub-assembly from the shock absorber itself.

In accordance with still another aspect of the present invention, which can also be employed with or without the various features mentioned above, the pressurizable fluid chamber includes a longitudinally fixed portion of the chamber member or other enclosure in part forming the fluid chamber, a flexible diaphragm member, and a sensor support member for the above-mentioned electrical inductance sensing device. The sensor support member and the sensing device generally surround the shock absorber and are spaced laterally outwardly therefrom. The sensor support member includes a laterally outwardly-extending flange thereon, and the longitudinally fixed portion of the fluid chamber enclosure is forcibly and permanently deformed in a generally laterally inward direction on opposite longitudinal sides of the support member flange portion in order to fixedly secure the sensor support member to enclosure. Preferably, a ring, which can be a one-piece structure or a composite structure, and which can be resilient or relatively rigid, is disposed on at least one longitudinal side of the support member flange portion in order to retain the sensing device components and/or to resiliently protect the sensor support member and the sensor device itself as the longitudinally fixed portion of the fluid chamber enclosure is forcibly deformed laterally inwardly.

Additional objects, advantages, and features of the present invention will become apparent from the following description and appended claims, taken in conjunction with the accompanying drawings.

BRIEF DESCRIPTION OF THE DRAWINGS

FIG. 3 is a partial longitudinal cross-sectional view of the shock absorber assembly of FIG. 2, illustrating the assembly when the housing and piston rod of the shock absorber are in generally intermediate relative longitudinal positions.

FIG. 4 is a partial longitudinal cross-sectional view similar to that of FIG. 3, but illustrating the housing and piston rod of the shock absorber in extended relative longitudinal positions.

FIG. 5 is a longitudinal cross-sectional view similar to that of FIGS. 3 and 4, but illustrating the housing and piston rod of the shock absorber in retracted relative longitudinal positions.

FIG. 6 is an enlarged detailed view of a cap member installable on the longitudinal outer end of the shock absorber housing for removably engaging and supporting the diaphragm support member of the shock absorber assembly illustrated in FIGS. 2 through 5, shown with the shock absorber piston rod extending therethrough.

FIG. 7 is an enlarged detailed cross-sectional view of one optional embodiment of the mechanism by which the diaphragm support member is removably attached to the shock absorber housing at one of the spaced-apart longitudinal positions thereon.

FIG. 8 is a detailed partial side-elevational view illustrating another optional embodiment of the mechanism by which the diaphragm support member is attached to the housing of the shock absorber.

FIG. 9 is a partial cross-sectional view taken generally along line 9—9 of FIG. 8.

FIG. 10 is an enlarged detailed cross-sectional view illustrating one optional embodiment of the mechanism by which the sensor device support member is secured to the chamber member of the shock absorber assembly illustrated in FIGS. 2 through 5.

FIG. 11 is an enlarged detailed cross-sectional view similar to that of FIG. 10, but illustrating another optional embodiment of the sensor support member attachment mechanism.

DETAILED DESCRIPTION OF THE PREFERRED EMBODIMENTS

Figure 1:
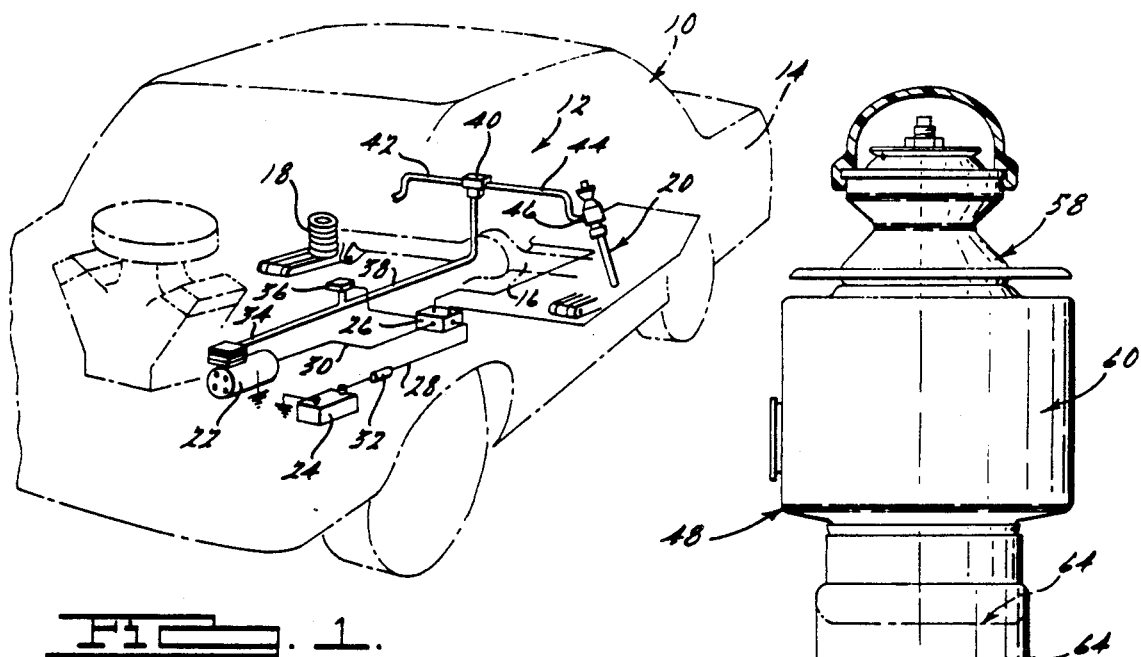
FIG. 1 is a diagrammatic and schematic representation of a preferred embodiment of the shock absorbing and leveling system of the present invention, shown generally in operative association with a typical automotive vehicle depicted in phantom lines.
Figure 2:
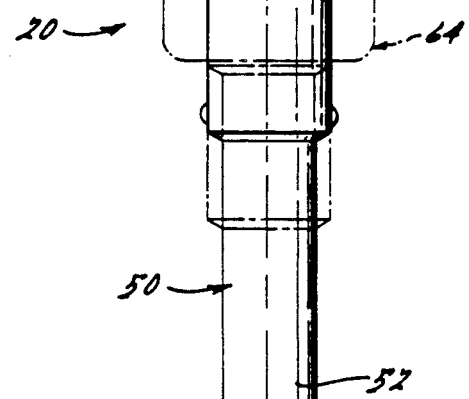
FIG. 2 is an enlarged side elevational view of a shock absorber assembly with a vehicle leveling system according to the present invention.
Figure 2:
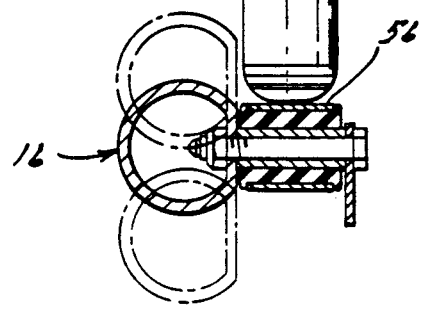

FIGS. 1 through 11 illustrate various exemplary embodiments of the shock absorbing and vehicle leveling system of the present invention, as adapted for use as a shock absorber assembly in an automotive vehicle. Although the present invention is shown in the exemplary embodiments depicted in the drawings as including a relatively conventional hydraulic shock absorber sub-assembly, one skilled in the art will readily recognize from the following discussion that the principles of the present invention are equally applicable to strut-type shock absorber assemblies or sub-assemblies, to conventional or strut-type shock absorber assemblies either with or without suspension coil springs surrounding the shock absorber assembly, as well as to shock absorber assemblies of other types adapted for other applications.

In FIG. 1, a vehicle 10 is shown in operative association with a preferred embodiment of a shock absorbing and vehicle leveling system 12 in accordance with the present invention. The vehicle 10 includes a sprung portion, generally referred to as a body or chassis 14, and an unsprung axle and wheel portion 16, between which main or primary suspension springs 18 can be interposed. A number of shock absorber assemblies 20 (of which only one is shown) can be included in the vehicle 10 for any or all of the vehicle's axle assemblies and are adapted to be selectively pressurized from a source of fluid pressure, such as an electrically energized air compressor 22. It should be noted that the shock absorber assemblies 20 can be the only suspension springs for the vehicle 10, or can be used in conjunction with other suspension spring components.

The compressor 22 is electrically energized from a conventional vehicle battery 24, which is electrically connected to an electrical control module 26 by way of an electrical conductor 28. The control module 26 is in turn connected to the compressor 22 by way of a suitable electrical conductor 30, with a suitable safety fuse 32 preferably being provided in the electrical circuit between the battery 24 and the remainder of the electrical components.

The compressor 22 supplies pressurized fluid, such as pressurized air, for example, through a fluid conduit 34 to a control valve device 36, another fluid conduit 38, a fluid conduit fitting 40, and a fluid conduit 42 to the shock absorber assembly 20. Typically, a second fluid conduit 44 is connected between the fitting 40 and a second shock absorber assembly (not shown).

When the vehicle 10 becomes heavily loaded, the control module 26 receives a signal (from a sensing device described below) indicating such loaded condition from the shock absorber assembly 20 in a manner described in more detail below. In response to a signal indicating that the vehicle is heavily loaded and the vehicle height is too low, the control module 26 energizes the compressor 22 and causes operation of the control valve device 36 in order to cause pressurized fluid to be supplied to the shock absorber assemblies 20, thereby raising the sprung portion 14 of the vehicle 10 to a predetermined desired level. When the vehicle 10 is unloaded, the control module 26 will similarly cause actuation of the control valve device 36 to vent pressurized fluid from the shock absorber assemblies 20 to the atmosphere in order to cause the sprung portion 14 of the vehicle 10 to be lowered to a predetermined desired level.

The shock absorber assembly 20, which is typical of the shock absorber assemblies of the vehicle 10, is shown in more detail in FIGS. 2 through 5. The shock absorber assembly 20 includes a shock absorber portion or sub-assembly generally indicated by reference numeral 50, which can be a direct-acting hydraulic shock absorber, for example. The shock absorber 50 includes an elongated cylinder or housing 52 and a reciprocable piston rod 54 extending longitudinally outwardly from one end of the housing 52 for longitudinal movement relative to the housing 52. The piston rod 54 is connected to a reciprocable piston (not shown) that is slidably and reciprocably received within the housing 52. In order to dampen relative movement between the sprung portion 14 of the vehicle 10 and the unsprung axle and wheel assembly 16, the lower end of the housing 52 is adapted to be secured to the unsprung axle and wheel assembly 16, or some other unsprung portion of the vehicle 10, by way of a lower end fitting 56. Similarly, the upper or longitudinally outer end of the piston rod 54 is adapted to be connected to the sprung portion 14 of the vehicle 10 by way of an upper end fitting assembly 58. The connections of the lower and upper end fitting assemblies 56 and 58 with the unsprung and sprung vehicle portions 16 and 14, respectively, are conventional and well-known to those skilled in the art. Therefore, such connections are not discussed in further detail herein.

The shock absorber assembly 20 also includes a chamber member 60, which also functions as a dirt or dust shield, and which is generally hollow and positioned in a generally surrounding relationship with at least a portion of the shock absorber 50. A longitudinally outer portion of the chamber member 60 is fixedly interconnected with the longitudinally outer end of the piston rod 54 and sealed therewith by a sealing member 62. A rolling flexible diaphragm member 64 has an outer end 68 sealingly interconnected with an optionally necked-down portion 76 of the chamber member 60 by a crimp member 78, or by other suitable mechanims for sealingly attaching the diaphragm member 64 to the chamber member 60 in order to define a pressurizable fluid chamber 65 with the shock absorber 50. A diaphragm support member 70, which is preferably a generally elongated tubular structure, preferably surrounds, and is laterally spaced outwardly from, the housing 52. The diaphragm member 64 is sealingly interconnected with an optionally necked-down portion 72 of the diaphragm support member 70 by a crimp member 74, or by other suitable mechanisms for sealingly attaching the diaphragm member 64 to the diaphragm support member 70. It should be noted that the chamber member 60, the diaphragm member 64, and the diaphragm support member can be either concentrically or eccentrically disposed with respect to the shock absorber 50, and that the diaphragm member 64 can alternatively be sealingly interconnected directly to the housing 52 in many applications.

The diaphragm support member 70 laterally supports at least a portion of the diaphragm member 64 in a laterally-outwardly spaced-apart relationship with the housing 52 preferably at least at a pair of longitudinally spaced-apart positions on the housing 52. The diaphragm support member 70 is removably interconnected with the housing 52 at such longitudinally spaced-apart positions preferably by a cap member 80 and a supporting ring 86. The preferred arrangement, by which the diaphragm support member 70 is spaced away from the housing 52 at least at a pair of longitudinal positions, reduces any tendency of the support member 70 to contact and rattle against the housing 52.

The cap member 80 has an opening 82 extending longitudinally therethrough for receiving the piston rod 54 inserted therethrough. The cap member 80 is preferably a generally cup-shaped structure adapted to be press-fitted or otherwise tightly receive the longitudinally outer end of the housing 52 in order to fixedly attach the cap member 80 to the housing 52. As illustrated in FIG. 6, the cap member 80 preferably includes a coating of elastomeric material 84 at least on its laterally outward side, and also preferably on its upper or longitudinally outer end surface. The cap member 80 also preferably includes a number of stiffening or strengthening ribs 88 extending laterally along its longitudinally outer surface and longitudinally along its laterally outer side. The elastomeric material 84 on the cap member 80, which can be a vulcanized rubber or other suitable elastomer, resiliently engages and laterally supports the diaphragm support member 70 in a laterally spaced-apart relationship with the housing 52. Such resilient engagement with the necked-down portion 72 of the diaphragm support member 70 allows the diaphragm support member 70 to be frictionally and removably attached to, and laterally supported by, the cap member 80 at one of the above-mentioned longitudinal positions on the housing 52.

At its opposite longitudinal end, the diaphragm support member 70 is removably interconnected with, and longitudinally supported by, the supporting ring 86, which is fixedly secured to the housing 52 in a fluid-type relationship therewith, such as by welding or by other suitable high-strength and fluid-tight attachment means. The supporting ring 86 includes a flange portion 90 extending laterally outwardly in order to longitudinally support the diaphragm support member 70 when the diaphragm support member 70 is installed on the shock absorber 50. An elastomeric O-ring or other sealing member 92 is sealingly disposed between the supporting ring 86 and the diaphragm support member 70 in order to insure that the pressurizable fluid chamber 65 is fluid-tight. When the fluid chamber 65 is pressurized with air or other fluid, the pressure of the fluid exerts a generally longitudinally downwardly-directed or longitudinally inwardly-directed, force using the diaphragm support member 70 against the flange portion 90 of the supporting ring 86 and thus maintains the diaphragm support member 70 in a longitudinally fixed position relative to the housing 52. Therefore, no further interconnection between the diaphragm support member 70 and the supporting ring 86 is needed in order to keep the air spring sub-assembly (chamber member 60, diaphragm member 64, and diaphragm support member 70) on the shock absorber 50 during use. However, in order to temporarily, but removably, attach the air spring sub-assembly to the shock absorber 50 during shipping or installation of the shock absorber assembly 20, or in other instances when the fluid chamber 65 is not pressurized, one embodiment of the invention includes at least one pin member 94 removably insertable through an opening 96 in the diaphragm support member and into an opening 98 in the supporting ring 86.

An optional arrangement of the temporary and removable interconnection between the diaphragm support member and the supporing ring is illustrated in FIG. 7, wherein an alternate supporting ring 186 is welded or otherwise fixedly secured to the shock absorber housing 52 and includes at least one slot or groove 102 extending in a laterally inward direction therein. An alternate diaphragm support member 170 is essentially identical to diaphragm support member 70 described above, except that the opening 96 is replaced by one or more tab members 104 that are bendably deflectable into the slot or groove 102 in the supporting ring 186 in order to removably interconnect the diaphragm support member 170 with the shock absorber housing 52 during shipping, installation, or other instances when the fluid chamber 65 (discussed above) is not pressurized.

In still another optional arrangement shown in FIGS. 8 and 9, still another alternate diaphragm support member 270 is substantially identical to diaphragm support member 70 described above, except for the provision of an outwardly-flared portion 271 having at least one opening 296 extending laterally therethrough. An alternate supporting ring 286 is welded or otherwise fixedly secured to the shock absorber housing 52 as described above, and includes a slot or groove 202 extending laterally inwardly therein. An interconnection ring 206 is interposed between the diaphragm support member 270 and the supporting ring 286. The interconnection ring 206 includes at least one laterally inwardly-directed tab portion 207 and at least one laterally outwardly-directed tab portion 208 thereon.

When the diaphragm support member 270 in FIGS. 8 and 9 is installed on the shock absorber 50, with the interconnection ring 206 interposed between the diaphragm support member 270 and the supporting ring 286, the tab portion 207 interlocking engage the slot or groove 202 in the supporting ring 286, and the tab portion 208 interlockingly engage the opening 296 in the diaphragm support member 270. Because the interconnection ring 206 is preferably composed of a resilient synthetic material, the tab portions 207 and 208 are resiliently deflectable laterally outwardly and inwardly, respectively, in order to allow the diaphragm support member 270 to be conveniently and removably interconnected with the shock absorber housing 52 by way of the supporting ring 286, with the longitudinally inner end of the diaphragm support member 270 engaging a laterally outwardly-extending flange portion 209 of the interconnection ring 206. As was mentioned above, such removable interconnection of the diaphragm support member 270 with the shock absorber housing 52 is needed only during shipping or installation of the shock absorber assembly 20, or in other instances when the fluid chamber 65 is not pressurized. It should be noted that any of the optional interconnection arrangements shown in FIGS. 7 through 9 may be optionally interchanged with that shown in FIGS. 3 through 5.

Referring primarily to FIGS. 1 through 5, the piston rod 54 and the shock absorber housing 52 move longitudinally relative to one another between expanded positions, as shown in FIG. 4, and retracted positions, as shown in FIG. 5, in response to increased or decreased loads between the sprung chassis portion 14 and the unsprung axle and wheel portions 16 of the vehicle 10. As mentioned above, the fluid chamber 65 can be pressurized by compressed air or other fluid in order to compensate for sustained increased or decreased loads on the vehicle 14. Such pressurized fluid is admitted to, or vented from, the fluid chamber 65 by way of a fitting 46 on the chamber member 60 and the fluid conduit 44, as discussed above.

In order to determine whether or not pressurized fluid should be admitted or vented from the fluid chamber 65, or to merely sense shock absorber positions if the above-described air-pressure diaphragm is not included, an electric inductance sensor 73 can be provided for sensing the longitudinal position of the housing 52 relative to the piston rod 54, and is fixedly attached to the chamber member 60 and contained and protected substantially wholly therein. The electrical inductance sensor 73 generally includes an electrical inductance coil 75 fixedly interconnected with a longitudinally inner end 77 of the chamber member 60 by way of a coil support member 79. The coil support member 79 and the electrical inductance coil 75 generally surround at least a portion of the shock absorber 50 and are laterally spaced-apart from the shock absorber 50 in a laterally outward direction. The electrical inductance coil 75 and the coil support member 79 extend generally in a longitudinal outward direction within the chamber member 60, where they are protected from dirt, dust, foreign objects, and other hazards of the vehicle undercarriage environment.

Preferably, the coil support member 79 includes a laterally outwardly-extending flange portion 81 fixedly interconnected with the chamber member 60, with the electrical inductance coil being positioned on a laterally outward side of the coil support member 79 and a longitudinally outward or upper side of the flange portion 81. The electrical inductance coil 75 and the coil support member 79 are fixedly interconnected with the chamber member 60 by the inner end 77 of the chamber member 60 being forcibly and permanently deformed in a generally laterally inward direction on opposite longitudinal sides of the flange portion 81.

In order to hold the electrical inductance coil 75 between the coil support member 79 and the inner end 77 of the chamber member 60, a ring 83 is disposed on at least one, or both, longitudinal sides of the flange portion 81. If necessary to resiliently protect the coil support member 79 and the electrical inductance coil 75 from damage or undesirable distortion as the inner end 77 of the chamber member 60 is forcibly deformed laterally inwardly, the ring 83 can be a resilient isolating ring. In one such embodiment of the invention illustrated in FIG. 10, the ring 83 can be a composite structure including an inner portion 85 composed of a synthetic resinous material and an outer portion 87 composed of a resilient elastomeric material. In this embodiment, the resilient outer portion 87 is resiliently compressed between the inner portion 85 and the longitudinally fixed inner end 77 of the chamber member 60 as the inner end 77 is forcibly deformed laterally inwardly. Preferably, the inner portion 85 includes a generally longitudinally-extending sleeve 89 and a generally laterally-extending lip 91, with the resilient outer portion 87 being resiliently compressed between the inner end 77 of the chamber member 60 and the sleeve 89 and the lip 91, as illustrated in FIG. 10. By such an arrangement, both the flange portion 81 of the coil support member 79 and the electrical inductance coil 75 are protected from damage during the deformation of the inner end 77 of the chamber member 60.

An optional embodiment of the ring 83 is shown in FIG. 11, wherein the alternate ring 183 is a one-piece structure, which can also optionally be composed of a synthetic resinous material that is resiliently compressible as the inner end 77 of the chamber member 60 is forcibly deformed around the flange portion 81 of the coil support member 79. It should be noted that in either of the optional and interchangeable embodiments of the ring 83 or 183, the ring holds the electrical inductance coil 75 in place and can be used to maintain the chamber member 60 and the electrical inductance coil 75 in a laterally spaced-apart relationship in order to protect the electrical inductance coil 75 from undesirable damage or deformation, as well as optionally providing a degree of resiliency to also protect the coil support member 79 and its flange portion 81 from undesirable damage or deformation. It should be noted, however, that either the ring 83 or the ring 183 can be a relatively rigid structure instead of the resilient structure described above.

In operation, the electrical inductance sensor 73 functions to sense sustained changes in the relative longitudinal positions of the shock absorber housing 52 and the piston rod 54, thereby sensing changed loadings on the vehicle 10. This is accomplished by the control module 26 causing an electrical current to be imposed through the electrical inductance coil 75. As more or less of the housing 52 and/or the diaphragm support member 70 moves longitudinally outwardly or inwardly within the electrical inductance coil 85, the overall inductance of the coil 75 is changed due to the presence of more or less of the mass of the housing 52 and/or diaphragm support member 70 therewithin. By measuring the changes in the electrical current through the electrical inductance coil 75, as caused by the changes in the inductance of the coil 75, the control module 26 causes the compressor 22 to be actuated in order to admit more pressurized air or other fluid into the fluid chamber 65, or alternatively to cause the control valve device 36 to vent pressurized air or other fluid in the fluid chamber 65 to the atmosphere, in order to cause the shock absorber 50 to expand or retract, respectively, to the desired relative longitudinal position between the housing 52 and the piston rod 54, thereby returning the vehicle 14 to a desired predetermined level or height. By such an arrangement, the shock absorber assembly 20 functions as a height-sensing and height-adjusting device that maintains the vehicle at a desired height, and wherein the airspring sub-assembly can be used as either an assist device for the above-mentioned primary spring 18, or as a primary spring itself.

It should be noted that in any of the embodiments of the invention described above, the shock absorber subassembly 50 and the airspring sub-assembly, which generally consists of the chamber member 60, the diaphragm member 64, the diaphragm support member 70, and the electrical inductance sensor 73, can be removed and replaced independently of one another. This feature greatly enhances the utility and convenience of the shock absorber assembly 20, as well as significantly reducing the cost of servicing and repairing the vehicle's shock absorbing and leveling system.

The foregoing discussion discloses and describes exemplary embodiments of the present invention. One skilled in the art will readily recognize from such discussion that various changes, modifications and variations may be made therein without departing from the spirit and scope of the invention as defined in the following claims.

We claim:
1. A fluid adjustable shock absorber assembly comprising:
 a shock absorber having an elongated housing, a piston slidably movable within said housing, and a piston rod attached to said piston and extending laterally outwardly from one end of said housing for longitudinal movement relative to said housing;
 a generally hollow and relatively rigid dirt shield generally surrounding at least a portion of said shock absorber and being removably and sealingly interconnected with a longitudinally outer end of said piston rod;
 a flexible diaphragm member sealingly interconnected with both said dirt shield and said housing in order to at least in part define a variable-volume pressurizable fluid chamber therewith;
 a generally tubular diaphragm support member for laterally supporting at least a portion of said diaphragm member in a laterally spaced-apart relationship with said housing at least at longitudinally spaced-apart first and second longitudinal positions thereon;
 a support ring fixedly attached to said housing at said second position thereon;
 a plurality of pin members operable to be inserted through said flexible diaphragm support member and into said support ring so as to removably attach said flexible diaphragm support member to said support ring; and
 a generally cup-shaped cap member having an opening extending longitudinally therethrough for receiving said piston rod, said cap member being fixedly attached to said housing at said first longitudinal position with a portion of said housing extending into said cap member, said diaphragm support member being removably attached to and laterally supported by said cap member at said first longitudinal position on said housing;
 whereby said flexible diaphragm member can be removably attached to said generally tubular diaphragm support member so as to permit said shock absorber to be selectively disconnected from said dirt shield.

2. The invention according to claim 1, wherein said diaphragm member is removably interconnected with said piston rod in order to allow said diaphragm member and said diaphragm support member to be removed as a sub-assembly from said shock absorber.

3. The invention according to claim 1, wherein said cap member includes a coating of elastomeric material on at least a laterally outward portion thereof, said diaphragm support member being removably engaged and laterally supported by said elastomeric material when said diaphragm support member is installed on said shock absorber.

4. The invention according to claim 1, wherein said supporting ring includes a flange portion extending laterally outwardly therefrom, said flange portion longitudinally supporting said diaphragm support member when said diaphragm support member is installed on said shock absorber.

5. The invention according to claim 4, further comprising sealing member sealingly interposed between said diaphragm support member and said supporting ring.

6. The invention according to claim 5, wherein said cap member includes a coating of elastomeric material on at least a laterally outward portion thereof, said diaphragm support member being removably engaged and laterally supported by said elastomeric material when said diaphragm support member is installed on said shock absorber.

7. The invention according to claim 6, wherein said diaphragm support member is removably attached to and longitudinally supported by said supporting ring at said second longitudinal position on said housing.

8. The invention according to claim 1, wherein said dirt shield is spaced laterally outwardly relative to said shock absorber and said diaphragm support member, said diaphragm member being sealingly attached to said dirt shield so that said dirt shield and said diaphragm member define said pressurized fluid chamber with said shock absorber and said diaphragm support member.

9. The invention according to claim 8, wherein said dirt shield, said diaphragm member and said diaphragm support member are removable as a sub-assembly from said shock absorber.

* * * * *

UNITED STATES PATENT AND TRADEMARK OFFICE
CERTIFICATE OF CORRECTION

PATENT NO. : 4,989,844

DATED : Feb. 5, 1991

INVENTOR(S) : Jan M. A. Wijnhoven, Henri C. J. Vanhove and Marc J. I. I. J. Panis It is certified that error appears in the above-identified patent and that said Letters Patent is hereby corrected as shown below:

Col. 5, Line 60, after "member" insert --70--;

Col. 7, Line 5, "supporing" should be --supporting--;

Col. 7, Line 39, "interlocking" should be --interlockingly--;

Col. 7, Line 39, "engage" should be --engages--;

Col. 7, Line 41, "engage" should be --engages--.

Signed and Sealed this

Twenty-fourth Day of November, 1992

Attest:

DOUGLAS B. COMER

Attesting Officer

Acting Commissioner of Patents and Trademarks